US011634307B2

(12) United States Patent
Edwards, Sr.

(10) Patent No.: US 11,634,307 B2
(45) Date of Patent: Apr. 25, 2023

(54) MECHANICAL TIRE LIFT

(71) Applicant: Kenneth Lee Edwards, Sr., Jeanerette, LA (US)

(72) Inventor: Kenneth Lee Edwards, Sr., Jeanerette, LA (US)

(*) Notice: Subject to any disclaimer, the term of this patent is extended or adjusted under 35 U.S.C. 154(b) by 0 days.

(21) Appl. No.: 16/029,326

(22) Filed: Jul. 6, 2018

(65) Prior Publication Data

US 2019/0010034 A1 Jan. 10, 2019

Related U.S. Application Data

(60) Provisional application No. 62/529,974, filed on Jul. 7, 2017.

(51) Int. Cl.
*B66F 5/04* (2006.01)
*B60B 30/10* (2006.01)
*B66F 7/24* (2006.01)
*B60B 29/00* (2006.01)
*B60B 30/02* (2006.01)

(52) U.S. Cl.
CPC .............. *B66F 5/04* (2013.01); *B60B 29/001* (2013.01); *B60B 29/002* (2013.01); *B60B 30/02* (2013.01); *B60B 30/10* (2013.01); *B66F 7/246* (2013.01); *B60B 2340/50* (2013.01); *B60B 2340/70* (2013.01); *B66F 2700/055* (2013.01)

(58) Field of Classification Search
CPC ........ B66F 5/04; B60B 29/001; B60B 29/002
USPC ........................................................ 414/427
See application file for complete search history.

(56) References Cited

U.S. PATENT DOCUMENTS

| | | | | |
|---|---|---|---|---|
| 3,301,419 A | * | 1/1967 | Molden .................. | B60B 29/002 414/428 |
| 3,830,388 A | * | 8/1974 | Mott ..................... | B60B 29/002 414/427 |
| 4,629,388 A | * | 12/1986 | Riemer ................... | B60P 3/127 280/47.131 |
| 5,387,069 A | * | 2/1995 | Asaumi ................. | B60B 29/002 414/427 |
| 5,513,938 A | * | 5/1996 | Chambers ........... | B05B 13/0242 414/427 |
| 6,382,644 B1 | * | 5/2002 | Rawlings .............. | B60B 29/002 280/47.35 |
| 6,390,762 B1 | * | 5/2002 | Peery ........................ | B66F 7/20 414/352 |
| 7,287,625 B1 | * | 10/2007 | Harris ................... | B66F 9/0755 187/237 |
| 7,677,582 B2 | * | 3/2010 | Hedley ................. | B60B 29/002 280/79.11 |
| 7,942,620 B2 | * | 5/2011 | Simard ................. | B60B 29/002 187/211 |
| 7,988,402 B2 | * | 8/2011 | Adams .................. | B60B 29/002 414/426 |

(Continued)

*Primary Examiner* — Jonathan Snelting

(57) ABSTRACT

A tire lifting assembly used to remove and replace a wheel and a tire on a vehicle is disclosed. The tire lifting assembly is configured to take the weight of the wheel and the tire when the service technician removes or replaces it thereby eliminating the need for manual efforts from a service technician. The assembly is rolled under the mounted wheel and tire and quickly adjusted to secure the wheel and tire by using a roller platform. A scissor jack mechanism is used to adjust the height of the roller platform which allows the rotation of the tire during the mounting procedure.

6 Claims, 11 Drawing Sheets

(56) References Cited

U.S. PATENT DOCUMENTS

| | | | |
|---|---|---|---|
| 9,573,420 B2* | 2/2017 | Hedley | B66F 7/26 |
| 9,796,568 B1* | 10/2017 | Gonzales | B66F 5/04 |
| 2017/0217743 A1* | 8/2017 | Mathieson | B66F 5/025 |

* cited by examiner

MECHANICAL TIRE LIFT

BACKGROUND OF THE INVENTION

A. Technical Field

The present invention generally relates to a tire lifting assembly. The invention is specifically related to a tire lifting assembly used to remove and replace a tire on a vehicle without requiring the routine manual servicing efforts of a technician.

B. Description of Related Art

With the introduction of automobiles, the collective condition of human society has changed dramatically. Cars and trucks have improved the lives of countless human beings and people are no longer limited to the few square miles around their residences. Food and consumer items are delivered on time and in specific places mostly due to trucks and other types of delivery vehicles. People are free to travel almost anywhere in the world in their automobiles even if roads do not exist or barely exist, and in certain cases, off-road vehicles can take them to new and interesting places that previously would only be accessible on foot or not at all Families can take vacations together and goods are delivered right to the door of a residence. Any number of journeys are possible and a person can get almost anything transported to almost anywhere. All this astonishing transportation rolls on wheels and tires that we depend on to perform their usually daily and reliable function. However, wheels and tires require regular maintenance to continue their service. When wheels and tires need service or replacement, it requires a technician in the service industry to repair or replace them.

Wheels and tires in general are quite bulky and depending on their size, the weight also varies. Regardless of the weight, the service technician is required to manually handle the wheels and tires to get them on and off the vehicle to perform the required service. During the service, removing wheels from the automobile or truck almost always requires the vehicle to be elevated in some way to remove the weight of the vehicle from the wheel and tire. This is usually performed in a workshop where a jack or a lift is used to raise the vehicle off the ground to gain access to the wheel and tire. Once the wheel is raised off the ground sufficiently, the wheel and tire could be removed from the vehicle by the technician.

The technician should possess excessive strength to remove the wheel and tire from the vehicle. However, regardless of the strength of the technician, repeated handling of heavy wheels and tires could take physical toll on the technician. Further, injuries are prone to happen and stress on the back and other parts of the body are common when repeated lifting of heavy objects is required to perform the service. Machines are there to help in certain circumstances but some types of service just require the manual intervention of a human technician to properly perform the required service of wheels and tires on an automobile or truck.

Therefore, there is a need for a tire lifting assembly used to remove and replace a tire on a vehicle without requiring the routine manual servicing efforts of a technician. Further, there is a need for a tire lifting assembly that could controlled remotely to remove and replace a tire on a vehicle without requiring manual labor.

SUMMARY OF THE INVENTION

The present invention relates to a tire lifting device that allows a user to lift vehicle and remove vehicle tires remotely without manual labor. Thereby, the device provides a more efficient and effortless handling of vehicle tire removal operation.

The tire lifting device of the present invention comprises a frame with at least two fixed wheels and at least one steerable wheel. The device further comprises a hydraulic jack, which is configured to raise or lower a roller stand receiving the wheel and tire. The roller stand further comprises rollers that allows the tire and wheel to spin freely. The device further comprises a tire guides located at the sides of the device. The tire guides are welded to a height adjustable support tubes. The tire guides are sized to accept tires and wheel from vehicles. The device further comprises dual action cylinders to hold the tire guides upright during use and retracts the tire guides when the load such wheel and tire, is to be removed from the device.

The tire lifting device is designed to operate by remote control unit and the device functions are powered either by electric or hydraulic operations. The Tire Lifting device is positioned by the remote-control unit under the mounted wheel and tire and quickly adjusted to secure the wheel and tire by utilizing the roller platform. Then, the tire lifting device is adjusted in height by the hydraulic jack. The roller platform contacts the tire and allows the tire to rotate while still mounted to the vehicle. This enables the technician to access the wheel lugs by easily rotating the wheel and tire. The tire guides secure the tire and prevent movement of the wheel and tire after the wheel nuts/lugs are removed manually. This arrangement allows the full weight of the wheel and tire to be carried by the device.

Further, on loosening the wheel and tire from the vehicle, the device could be positioned away from the vehicle utilizing a power drive of wheels and the remote-control unit. The procedure is performed in reverse on re-mounting of the tire and wheel onto the vehicle.

In another embodiment, a tire lifting assembly used to remove and replace a wheel and a tire on a vehicle without having to manually lift them with the help of efforts from a service technician is disclosed as follows. In an embodiment, the tire lifting assembly is configured to take the weight of the wheel and the tire when the service technician removes or replaces it. The tire lifting assembly is simply rolled under the mounted wheel and tire and quickly adjusted to secure the wheel and tire by using a roller platform, wherein the roller platform is adjusted in height by a scissor jack mechanism built into the assembly. The roller platform comprises a pair of steel rollers located on the top of the assembly configured to allow the rotation of the tire during the mounting procedure which enables the technician to access all the wheel lugs by easily rotating the wheel and the tire.

In another embodiment, the tire lifting assembly comprises steel adjustable brackets located on the side of the assembly to securely hold the tire on the assembly and prevent movement of the wheel and the tire once the wheel lugs are removed by the service technician. This allows the full weight of the wheel and tire to be carried by the assembly. Once the wheel and tire are removed from the vehicle, the tire lifting assembly could be rolled away from the vehicle using one or more casters that are positioned on the bottom of the assembly.

Other objects, features and advantages of the present invention will become apparent from the following detailed description. It should be understood, however, that the detailed description and the specific examples, while indicating specific embodiments of the invention, are given by way of illustration only, since various changes and modifi-

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
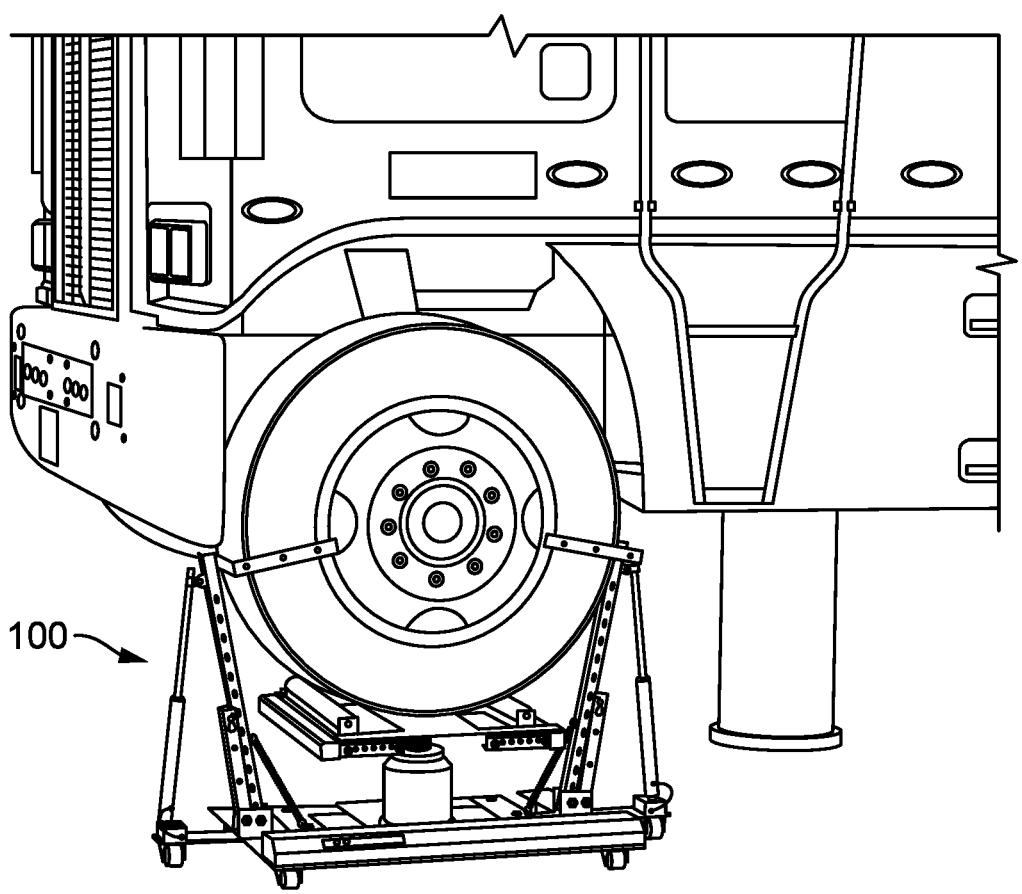
FIG. 1 shows a front perspective view of a tire lifting device in use with a vehicle in an embodiment of the present invention.

Referring to FIG. 1, the present invention discloses a tire lifting device 100 for handling tire removal from vehicles without manual labor. The tire lifting device 100 is remotely controlled to remove and replace the vehicle tire and wheel. The tire lifting device 100 is electrically and hydraulically powered to eliminate the manual handling of large, heavy and bulky wheel and tire on vehicles.

Figure 2:
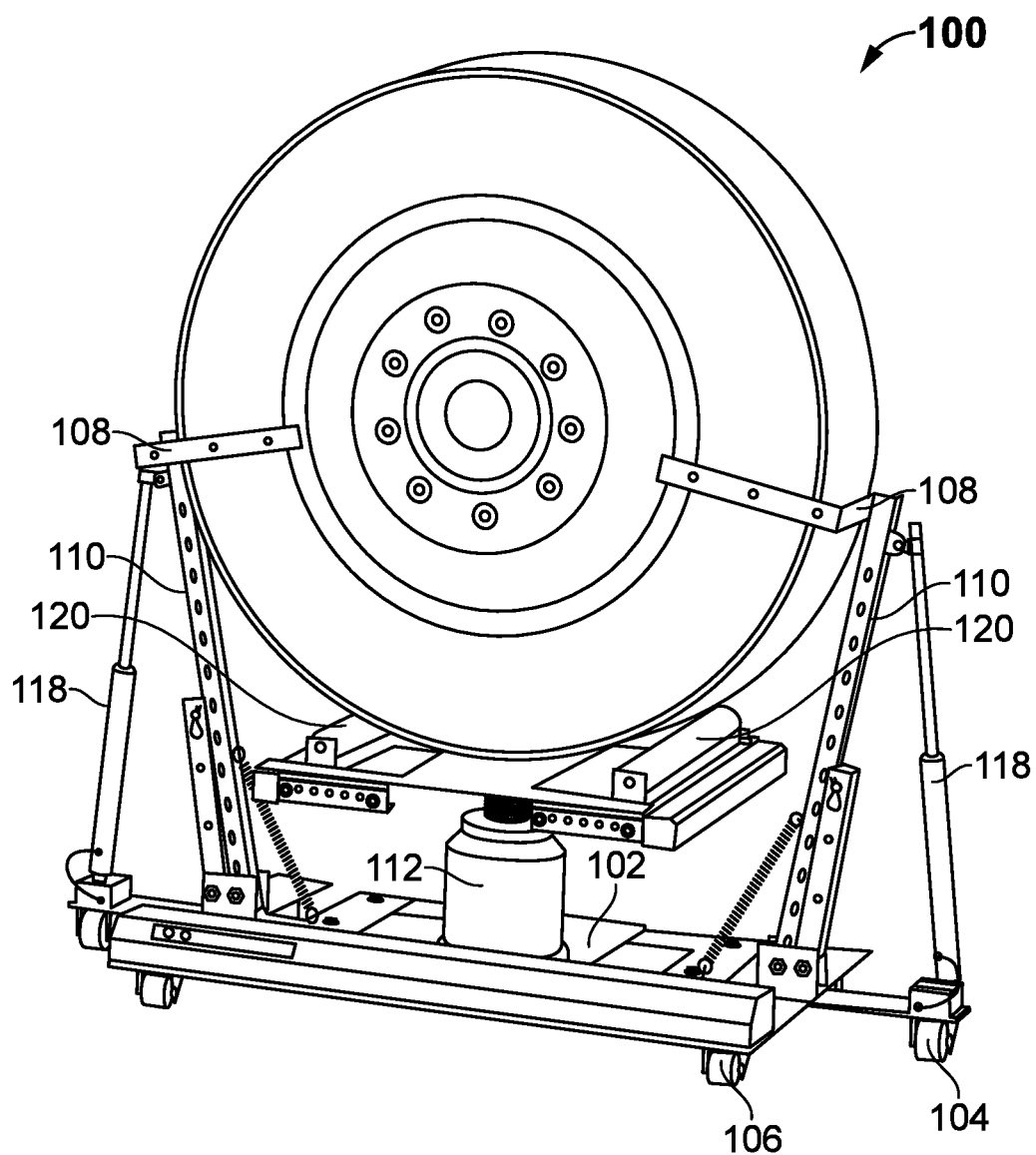
FIG. 2 shows a perspective view of the tire lifting device in operative position with a vehicle tire and wheel in an embodiment of the present invention.

Referring to FIG. 2, the device 100 comprises a frame 102 with at least two fixed wheels 104 and at least one steerable wheel 106. The device 100 further comprises a hydraulic jack 112, which is configured to raise or lower a stand receiving the wheel and tire. The stand further comprises rollers 120 that allows the tire and wheel to spin freely. The device 100 further comprises a tire guides 108 located at the sides of the device 100. The tire guides 108 are welded to a height adjustable support tubes 110. The tire guides 108 are sized to accept tire and wheel from vehicles. The device 100 further comprises dual action cylinders 118 configured to move said tire guide between an extended configuration and a retracted configuration. In one embodiment, the dual action cylinders 118 is configured to hold the tire guides 108 upright or in an extended configuration during use and retracts the tire guides 108 when the load such as wheel and tire, is removed from the vehicle. In one embodiment, the tire guides 108 is configured to stabilize the wheel and tire for removal from the vehicle. The device further comprises a power and control unit 130 including on board computer or controller.

Figure 3:
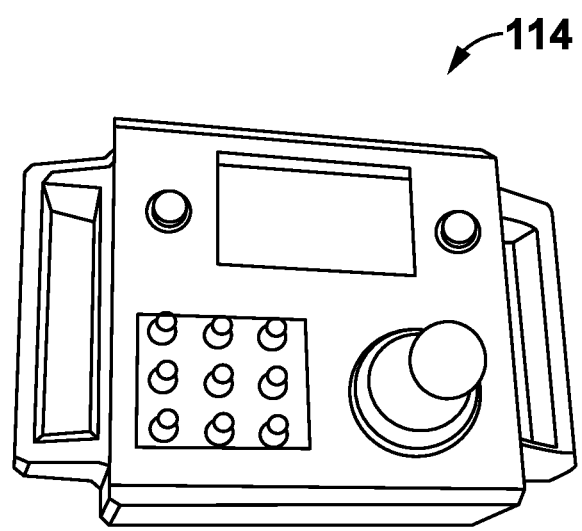
FIG. 3 shows a perspective view of the remote-control unit of the tire lifting device in an embodiment of the present invention.
Figure 4:
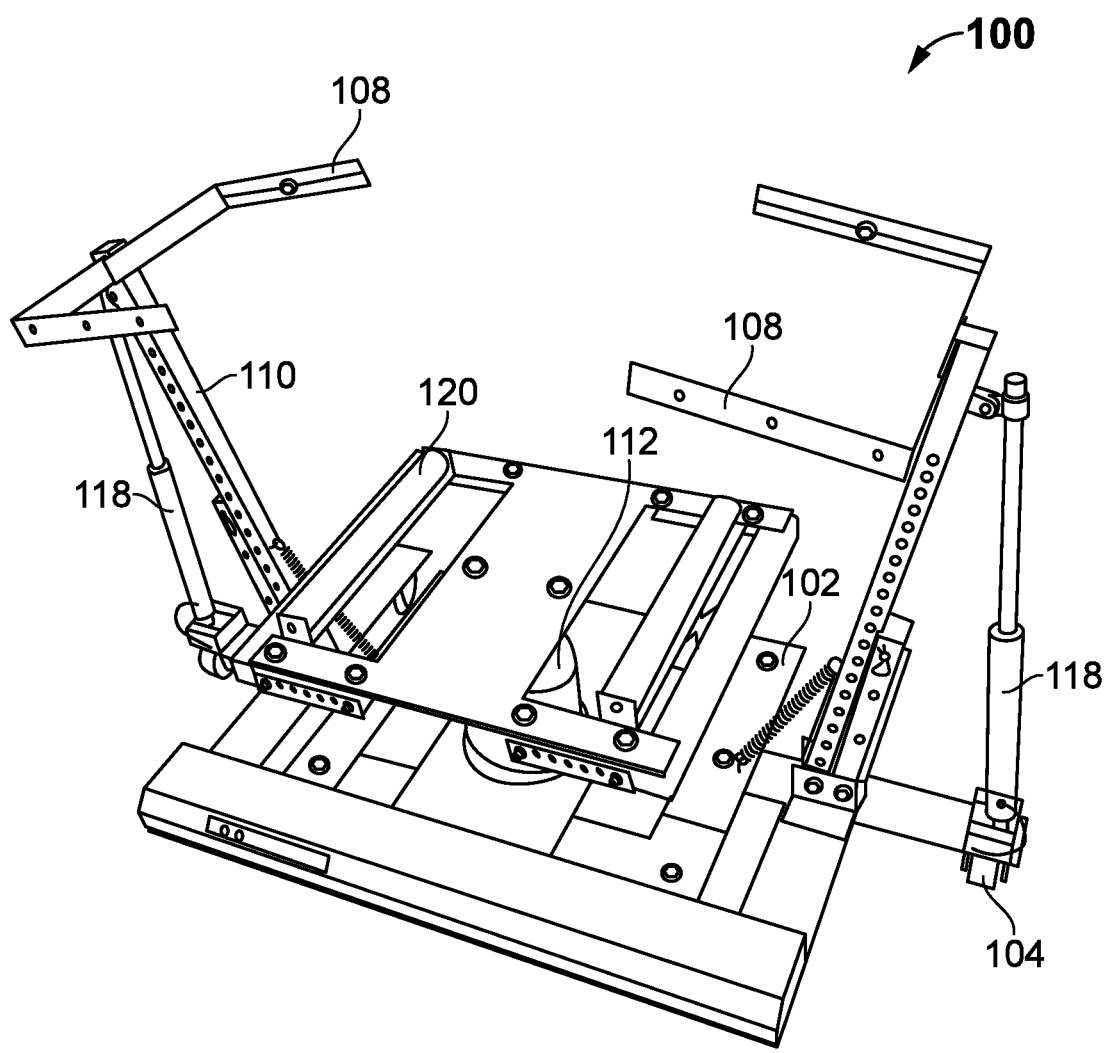
FIG. 4 shows a top perspective view of the tire lifting device in an embodiment of the present invention.

Referring to FIG. 3, the present invention further comprises a remote-control unit 114 having a plurality of control member, which allows an operator to position the device 100 on to the wheel and the tire of the vehicle to be serviced. Referring to FIG. 4, the perspective view of the device 100 is shown in an embodiment of the present invention.

Figure 5:
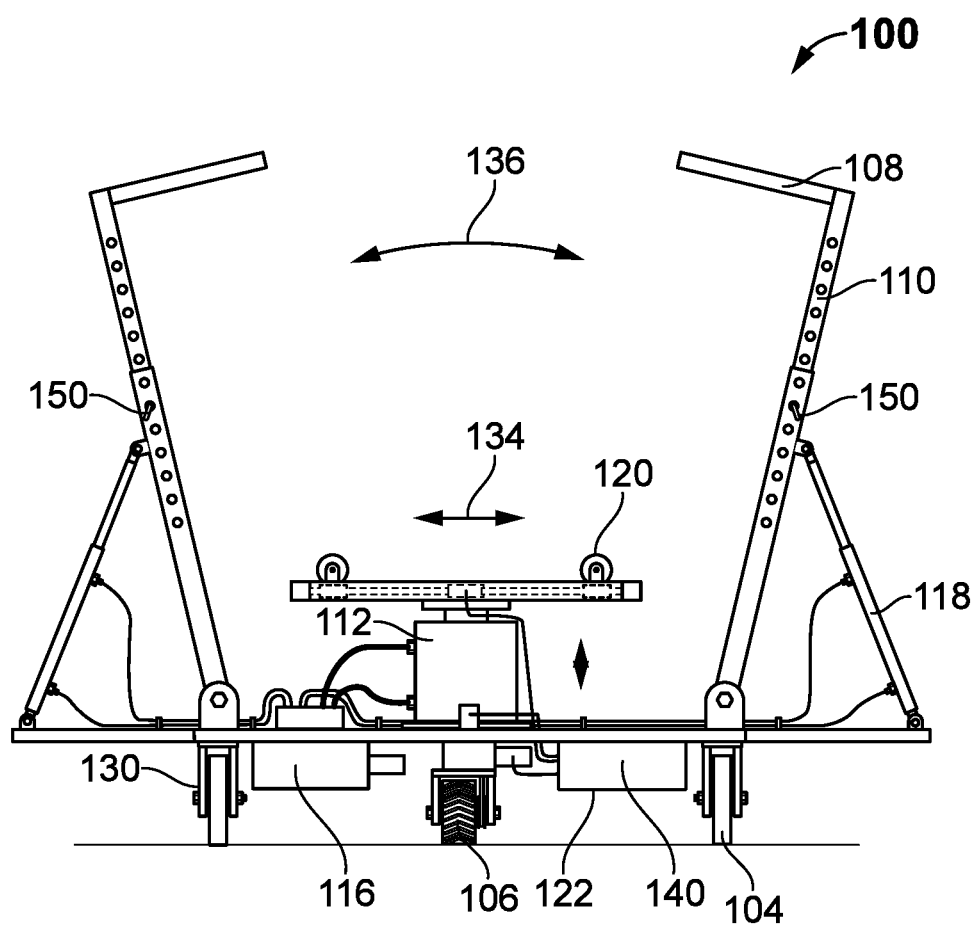
FIG. 5 shows a side view of the tire lifting device in an embodiment of the present invention.

Referring to FIG. 5, the side view of the device 100 is shown in an embodiment of the present invention. The device 100 further comprises a hydraulic reservoir and electrical pump 116 to drive the central hydraulic jack 112 and the support tubes 110. The device 100 further comprises a fixed caster located under the frame 102, which balances the load using a tricycle caster system. In an embodiment, the at least two fixed wheels 104 and the at least one steerable wheel 106 makes the stable tricycle caster system to travel over the surface such as concrete, asphalt, gravel and compacted dirt surfaces. The device 100 further comprises dual action cylinders 118 to open or close the tire guides 108 on the load along arcuate path 136.

Figure 6:
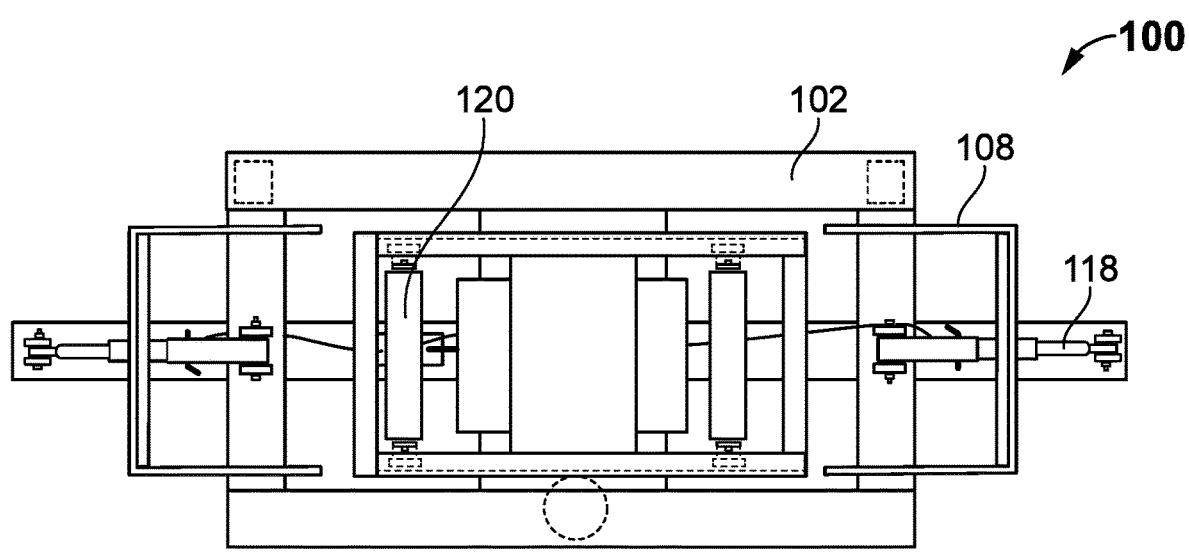
FIG. 6 shows a top view of the tire lifting device in an embodiment of the present invention.

The tire guides 108 are welded to the adjustable height support tubes 110, which are pinned together using bent shaft quick release pins 150. The tire guides 108 are sized to accept tire and wheel from vehicles such as OTR trucks, skid steer, front tractor tires, and other similar sized industrial tires. Referring to FIG. 6 and FIG. 5, the rollers 120 are adjusted in and out direction represented by a double headed arrow 134. In one embodiment, the rollers 120 are the galvanized steel rollers. The device 100 further comprises an electronic enclosure 122, which is mounted under the frame 102 and is protected by the frame 102 from things being dropped on it. The double acting hydraulic jack 112 is under hydraulic pressure controlled by a microcomputer or a on board computer in the electronic enclosure 122 and solenoids above the hydraulic pump and reservoir 116.

Figures 7A, 7B, 7C:
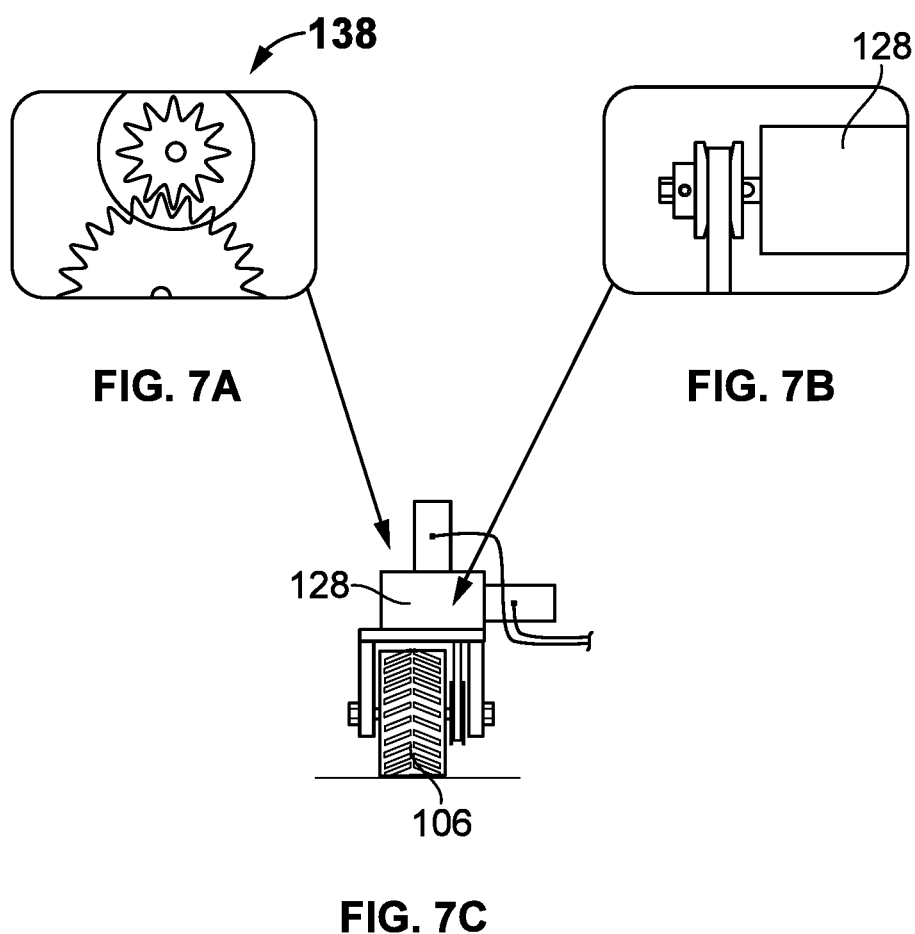
FIG. 7A shows a steerable wheel with a V belt drive of the tire lifting device in an embodiment of the present invention.
FIG. 7B shows a V belt drive of the tire lifting device in an embodiment of the present invention.
FIG. 7C shows a gear assembly of the V belt drive in an embodiment of the present invention.

Referring to FIG. 6, a top view of the device 100 is shown in an embodiment of the present invention. In another embodiment, the tire guides 108 comprise an adjustable width guide to adjust the tire guides 108 in or out. Further the steel components of the device 100 are painted and thermally cured to provide a scratch and corrosion resistant surface. Referring to FIG. 7A, the at least one steerable wheel 106 with a V belt drive 128 of the device 100 is disclosed in an embodiment of the present invention. Referring to FIG. 7B, the V belt drive 128 moves with the device 100 in forward or reverse at various speeds as operated by the operator via the remote-control unit 114. The V belt driven electrical caster is steerable by a directional motor control which can move +/−90 degrees. This makes the wiring less complicated and prevents wrapping of feed wires around the steerable wheel base. Referring to FIG. 7C, the V belt drives 128 uses gears 138 to rotate the steerable wheel 106 up to +/−90 degrees to steer the tricycle system to mount or dismount the vehicle wheel and tire.

Figure 8:
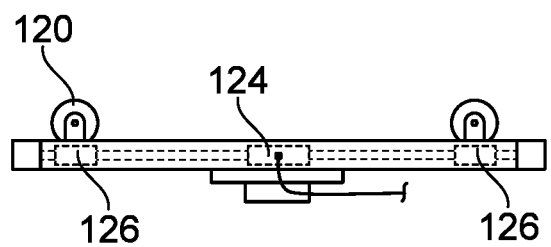
FIG. 8 shows a roller width drive of the tire lifting device in an embodiment of the present invention.

Referring to FIG. 8, a roller width drive 124 of the tire lifting device 100 is disclosed in an embodiment of the present invention. The roller width drive 124 comprises a DC motor. The rollers 120 are supported on permanently lubricated roller bearings and supports loads up to 575 pounds using a ball screw assembly with center DC motors and mated left and right-hand Acme screws. The controller engages with the roller width drive 124 motor to rotate the shafts in the correct direction. A drive nuts 126 moves in or out under control of the remote-control unit 114 as directed by the operator using the remote-control unit 114. The operator employs swipes, pinches, and finger placements to guide the device 100 on the remote-control unit 114. As the drive nut 126 moves in or out, the rollers 120 moves in or out to support the tire as directed by the operator. A two drive motors are slaved together to insure the rollers 120 move in or out at the same rate so the rollers 120 are always parallel.

Figure 9:
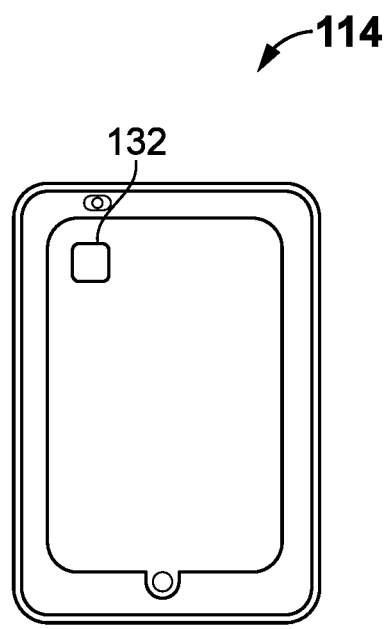
FIG. 9 show a front view of the remote-control unit of the tire lifting device in an embodiment of the present invention.

Referring to FIG. 9, the remote-control unit 114 is shrouded with rubber to reduce drop shock effects and improve resiliency. In one embodiment, the remote-control unit 114 is a tablet. The tablet uses the latest in processors, WiFi, and Bluetooth connectivity to converse with the device 100 effectively. Further, the remote-control unit 114 comprises hardened glass touchscreen that allows operation even with mechanics gloves on the operator hand. Further the present invention uses wireless charging that allows easy recharging of the remote-control unit 114.

The remote-control unit 114 further comprises an icon 132 that allows easy location of the operating application, which allows full control of the device 100 over all sorts of terrain and use on distinct types of wheel and tire. The application allows control of the roller width, jack height, guide width, ground speed and direction, and allows micro-positioning of the wheel and tire for installation or removal with a dramatic reduction in physical labor. The application work with any a computing device such as a computer, tablet, or smartphone.

In one embodiment, the frame 102 of the device 100 is fabricated from 0.5" thick cold rolled steel plate. The steel is cut to shape from sheet stock using a water jet machining center. Further, all the bolt holes and openings are formed. Furthermore, various small parts such as side support hinge plates and the double acting cylinder mounts are also cut from the 0.5" thick sheet stock. The frame 102 is then placed in a jig and robotically welded to join all sections into one contiguous base and the small parts are also welded in place. After welding, the device 100 is powder painted and thermally cured to make a scratch and corrosion resistant surface.

In one embodiment, the support tubes 110 are cut to length from the steel and holes are formed using the water jet machining center. The support tube 110 comprises a large outer tube and a small interior tube. The larger outer tube accepts the slightly smaller interior tube. The outer tube and the interior tube have mating holes that align and accept the quick release pin 150 to adjust the height of the tire guides 108. The lower outer tubes are drilled to accept hardened steel bolts allowing the support tubes 110 and tire guides 108 to be moved in or out under control by the dual action cylinders 118, which are controlled by the tablet working with an onboard computer.

In an embodiment, the tire guides 108 are formed using 1" wide by 0.25" thick steel bars, which are formed into 14" wide by 6" deep U channels. These channels are welded onto the upper support tubes 110 with the U opening toward the center of the device 100. The 14" wide tire guides 108 would accommodate almost any vehicle tire and wheel including over the road wheels and tires, most farm tires, and industrial wheels/tires like skid steer units. In another embodiment, the tire guides 108 could be fabricated to adjustable in width.

The back section is drilled to accept 2 bolts that retain the U shape while allowing the tire guides 108 to be adjusted in width.

In one embodiment, the steel components could be supplied in almost any vibrant color, so a distinctive color may be chosen to enhance the product recognition factor, which could dramatically improve the market adoption of the device 100. In one embodiment, the fixed wheels 104 comprises fixed casters with sealed, pre-lubricated bearings. The casters and wheels are galvanized to prevent rust and corrosion. Each caster of the fixed wheels 104 could support up to 675 pounds with a large safely margin. The combination of the fixed wheel 104 and the steerable drive wheel 106 allows the device 100 to be driven forward and backward to the optimum position to mount or dismount the wheel/tire.

In one embodiment, the steerable wheel 106 is urethane rubber coated, steel drive wheel. The drive or steerable wheel 106 is steerable at variable speed to allow easy positioning of the device 100. The DC drive motor and steering motor runs on the 18V battery are operated in conjunction under on-board computer control. The device 100 could quickly move between the vehicle and the tire repair station or could move minutely to position wheel/tire in optimum location. The steerable wheel 106 is capable of rotating ±90° from straight back and this movement is sufficient to allow micro-positioning as required. The steerable wheel 106 could support up to ⅓ of the 1,000 pound-maximum product loads with a significant safety margin.

In one embodiment, the hydraulic DC operated pump and reservoir 116 is mounted in the end of the hydraulic housing which is located under the frame 102 of the device 100. The DC pump maintains a 100 PSI pressure and comes on when the flow requirement is engaged by the computer operating the solenoid valves to move the tire guides 108 or raise or lower the jack assembly 112. The fluid flows out of or back through the solenoid valves as required and is retained in the reservoir. The reservoir has a sight glass that allows the operator to observe the fluid level in the reservoir when the device 100 is at rest.

In one embodiment, the dual action cylinders 118 are a commercially available long stroke, double acting cylinders that have the capability to move the tire guides 108 and the wheel/tire to insure proper sitting on the rollers 120 on the jack 112.

The controlling computer utilizes optical position sensors 140 in the lower pin area to determine the angle, so the tire guides 108 are positioned at similar angles on each side, insuring the wheel/tire is positioned in a center location on the rollers 120.

In one embodiment, the hydraulic jack 112 is a commercially available, double acting hydraulic jack, which has a lift stroke of 12.5" and will lift a load of 16,000 pounds. The heavy-duty jacks 112 are made for frequent commercial use. The ram is nickel-plated for corrosion resistance and smooth operation against the seals. The double action allows for fine positional control using the tablet working in conjunction with the on-board controlling computer.

In one embodiment, the roller width drive 124 is a central bi-directional DC motor upon which Acme ball screws are mounted. The ball nuts are mounted in steel slides that move in or out as the motor is turned. The drive employs two different screws, a left and a right-handed ball screw to move the ball nuts in or out when the motor turns. There are two drive nuts 126, one on each side of the roller end, and they are synchronized to keep the rollers 120 parallel. The 13" wide steel rollers 120 with sealed, pre-lubricated bearings are capable of supporting 575 pounds each. Having the wheel and tire on the rollers 120 allows the technician to easily rotate it to align the studs for installation after it is micro-positioned with the device 100.

In one embodiment, the onboard computer is fabricated to control the hydraulic and DC electric motors to perform the movement functions of the device 100. This ruggedized computer is placed in a sealed housing under the steel frame 102. The Bluetooth 4.0 and 802.11ac WiFi data access provides excellent and reliable uptime and the proprietary operating program allows macro and micro positioning. The controlling computer is supplied with, but not limited to, processor, memory, hard drive size, operating system, audio, ports, battery, wireless unit, Bluetooth and charging port.

In one embodiment, the remote-control unit 114 is ruggedized tablet designed to use in the harsh shop environment. The thick rubber case and hardened touch screen is perfect for the maintenance operation. The remote-control unit 114 comprises a fast 4G LTE broadband and 802.11ac WiFi data access to provide excellent and reliable uptime. The tablet is supplied with, but not limited to, display, processor, memory, hard drive size, operating system, media drive, audio and video unit, ports, battery, camera, wireless unit, Bluetooth and recharging unit.

In one embodiment, a PCBs of the remote-control unit 114 and on board computer are fabricated based on the final assembler's requirements. The standard thickness, double sided FR4 circuit board material is populated with surface mounted components. Any through-hole devices are inserted after the surface mounted assembly, soldering, and cleaning. Both circuit boards are designed to have all the components oriented, so they can be mounted with the LED illuminators projecting out of the lenses mounted in the housings. After assembly, the PCBs are protected with a moisture adsorption preventive conformal coating.

In one embodiment, the frame 102 of the device 100 is supplied with at least two LED (Light Emitting Diode). In one embodiment, the LED is an 18-Watt LED floodlights, which is mounted on the frame 102 opposite to the steerable wheel 106 and projecting outward and slightly upward. These commercially available lights illuminate the workspace where the wheel and tire are mounted and the ground upon which the device 100 is being driven. The lights are 4" square with aluminum heat dissipating housings. The 6-LED chip lighting modules project light out at a 60° angle providing a broad viewing angle for work and efficient nighttime operations. The LED lighting has a very long operating life and could easily withstand the harsh environment. The 12-volt lighting is operated by the on board controlling computer and is driven through a power supply operating from the 18 V battery.

The tire lifting device 100 according to the present invention, has the following advantages: allows to remove or replace wheels and tires from a vehicle; enables to operate the device 100 with a wireless remote control unit 114; rotates vehicle wheels on rollers 120 for access to wheel rugs; provides roller adjustable function for different size tires; provides an adjustable tire guides 108 for securing the wheel and tire in the device 100; eliminates manual labor of lifting wheel and tire to mount or remove; saves service technician from physical injury or strain; and provides long service of device 100 by utilizing high quality material.

Figure 10:
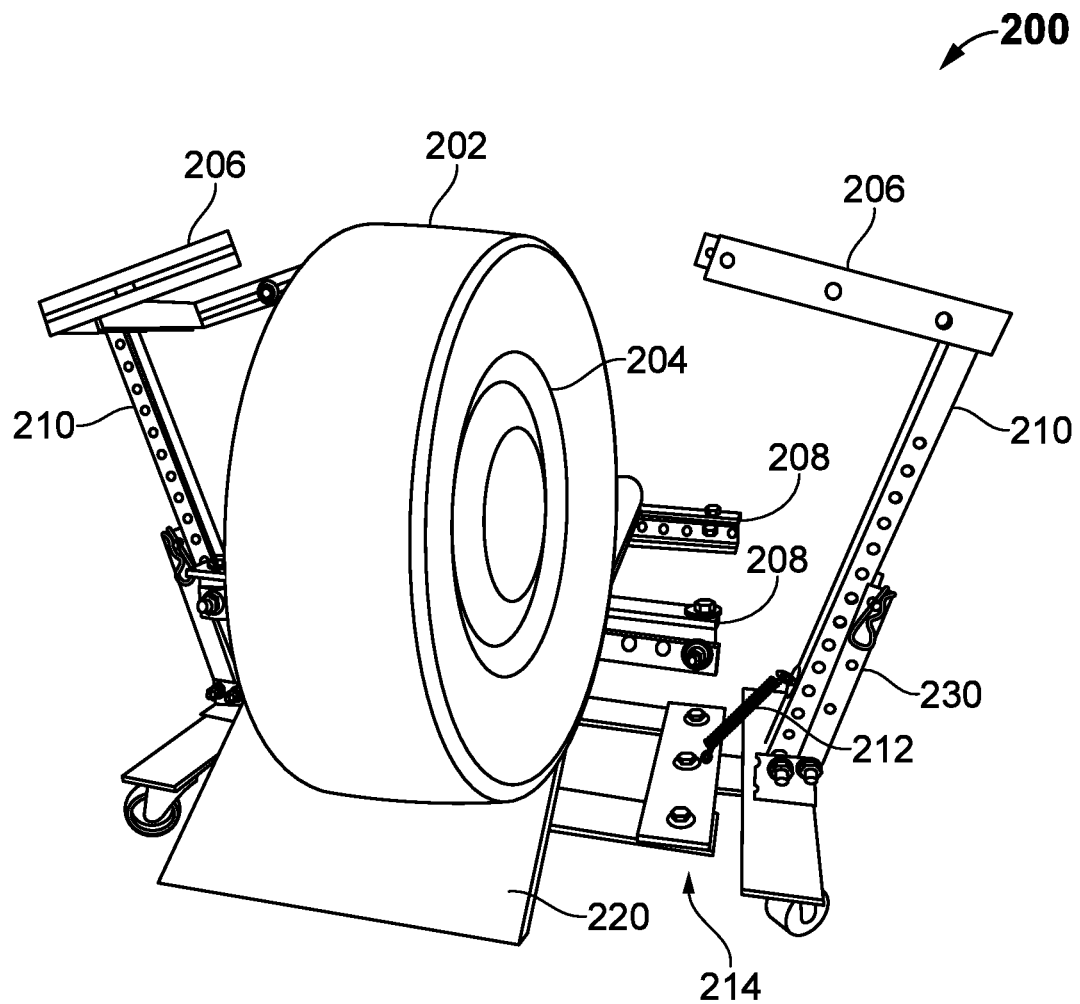
FIG. 10 illustrates a perspective view of a tire lifting assembly used to remove a wheel and a tire from a vehicle, in another embodiment of the present invention.

In another embodiment as shown in FIG. 10, a tire lifting assembly 200 used to remove and replace a wheel 204 and a tire 202 on a vehicle without having to manually lift them with the help of efforts from a service technician is illustrated.

In an embodiment, the tire lifting assembly 200 is configured to take the weight of the wheel 204 and the tire 202 when the service technician removes or replaces it. The tire lifting assembly 200 is rolled under the mounted wheel 204 and tire 202 and quickly adjusted to secure them by using a roller platform 208, wherein the roller platform 208 is bolted to a roller attachment and adjusted in height using a scissor jack mechanism built into the assembly 200. The roller platform 208 comprises a pair of steel rollers located on the top of the assembly 200 configured to allow the rotation of the tire 202 during the mounting procedure which enables the technician to access all the wheel lugs by easily rotating the wheel 204 and the tire 202. A pair of slotted arms 210 and steel adjustable tire brackets 206 are provided in the assembly 200 to securely hold the wheel 204 and the tire 202 and prevent their movement once the wheel lugs are removed by the service technician. This allows the full weight of the wheel 204 and tire 202 to be carried by the assembly 200. The mounted and balanced wheel/tire (204, 202) placed on roller platform 208 and held in a vertical position with the help of adjustable tire bracket 206 which acts as wheel guides allows the technician to move the wheel guides to perfectly fit the tires being mounted on the assembly 200. A pair of strong tension springs 212 are provided to support the slotted arm 210 to hold the tire 202 upright and the wheel 204 on the assembly 200 securely.

In one embodiment, the tire lifting assembly 200 comprises one or more caster wheels positioned on the bottom of the assembly 200 beneath a wheel base plate. Once the wheel 204 and tire 202 are removed from the vehicle, the caster wheels are configured to move the tire lifting assembly 200 away from the vehicle. The caster wheels are preferably made from a polyurethane rubber material and are highly resistant to household and automotive chemicals. The rubber's compliance also allows the assembly 200 to move easily over a grimy or gritty floor. They are bolted onto the bottom of the wheel base plate allowing complete 2 axis freedom of movement and does not flat spot when parked over a long time with a load. Each of the caster wheel is configured to up to 206 pounds, for a total load of 480 pounds which is enough to carry the mounted tire 202 and wheel 204 plus the weight of the assembly 200. They have fully swiveling configuration with 2.5" diameter by 0.75". A tire lift base 214 is also provided to support and carry the scissor jack mechanism and the tire 202. A tire lift and wheel base attachment acts as a support plate to provide additional durability for the assembly 200.

In preferred embodiments, the scissor jack mechanism mounted in the assembly 200 is configured to lift a 1.5-ton load. The jack is supplied with a manual crank and an adapter that allows use with a reversible battery powered or an air driver. One or more quick release pins are provided to allow the user to configure the tool to optimally fit the wheel/tire (204, 202) being placed upon the vehicle. In different embodiment, a handle is attached to the roller platform 208 to assist the service technician to pull the assembly 200 easily.

In preferred embodiments, the rollers are fabricated using commercially available ball bearing conveyor rollers. These 13" rollers are supported by guides that ride on an inverted T shape base, which is welded to the plate that is bolted to the scissor jack top plate and are retained by the quick release pins. The heavy-duty rollers are fabricated using 12-gauge (0.081" thick) steel and are zinc plated for rust and corrosion protection. Each roller 110 could support up to 525-pound load. The bearings are pre-lubricated, sealed, and remains lubricated over the useful life of the assembly 200.

The roller platform 208 is bolted to the top plate of the commercially available 1.5-ton scissor jack mechanism.

The slotted arm 210 acts as a channel section to hold the wheel 204 and the tire 202 are milled to accept the quick release pins, allowing the user to move the adjustable tire bracket 206 to fit the tires being mounted on the assembly 200. The adjustable tire bracket 206 is a wheel guide fabricated using 0.25" thick steel plate, which is welded to the top of the height adjustable channel. The wheel guides 206 are adjustable in or out and use carriage bolts with rounded heads to prevent catching in the tire tread. Further, the wheel guides 206 also includes roller ball bearing for sliding on the surface of the tire tread to hold them on the assembly 200 securely.

An arm stopper 230 (shown in FIG. 10) is also provided to support the slotted arm 210 during the height adjustment. An arm and pin stopped bracket is provided to carry threaded rods to adjust the length of the slotted arm 210 to support the wheel 204 and the tire 202 to be carried by the assembly 200.

In one embodiment, all the components in the assembly 200 such as rollers, guides, slides, and channels are secured in the optimum position using the quick release pins 150 (shown in FIG. 5) which slide into holes machined into the channels, . . . . The stainless steel quick release pins 150 (shown in FIG. 5) remain in place until the user pulls them out., whereupon the ball is pushed into the pin, allowing retraction or insertion. Once they are fully seated, the spring-loaded ball is pushed out to its limit and keeps the pin from sliding out of the machined holes in the slotted arm. The 0.5" steel wheel base plate with steel gusset plate welded blow can be lightened by milling 3" diameter holes in the plate.

Figure 11:
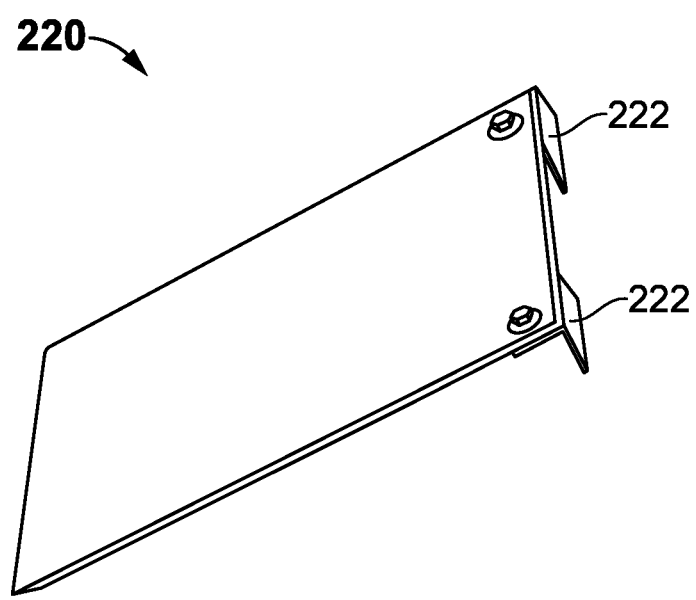
FIG. 11 illustrates a perspective view of a tire ramp, incorporating the aspects of the present invention.

FIG. 11 illustrates a perspective view of a tire ramp 220, incorporating the aspects of the present invention. The tire ramp 220 is detachably coupled to the ramp platform 208 via one or more pegs 222. The tire ramp 220 is configured to enable the service technician to roll on and off the wheel 204 and tire 202 from the assembly 200, eliminating a need for a lift operation the wheel 204 and tire 202. In one embodiment, the tire ramp 220 is made of aluminum material, which makes it easy to handle the tire ramp 220.

In preferred embodiments, the fabrication of the components of the tire lifting assembly 200 is disclosed. The components of the assembly 200 are fabricated using cold or hot rolled steel plate or channel and are cut to shape using water jet machining They are machine positioned and robotically welded where required. After cutting to size and shape or welded, they are deburred, cleaned, electrostatically painted, and thermally cured. This coating provides a very durable surface, which is very resistant to scratches and corrosion. All these steel components could be powder painted in almost any vibrant colors, so a distinctive color may be chosen to enhance the product recognition factor of the assembly 200.

In one embodiment, the wheel base plate is fabricated from a 0.50" thick cold rolled steel sheet wherein water jet machining center is used to cut the shape, develops the holes, and cuts the reinforcing gussets from the same material. The components of the scissor jack mechanism are cut to shape from 0.75" thick cold rolled steel plate. The roller platform 208 and the supports are cut from 0.375" wall, extruded T shaped steel stock, which is inverted and welded to the 0.75" thick scissor jack plate. The slotted arm channels are 0.25" extruded steel channels that are sized to fit snugly in the application, with the larger superimposed upon the smaller inner. The water jet machining center cuts them to length, and then mills the mating holes in the sides of the channels to accept the QDPs. After milling, the spring retention tab is welded onto the channel. The adjustable tire brackets 206 are cut to length from 1" wide by 0.375" thick cold rolled steel strap wherein width adjustment holes are milled and the side guides are bent 90° in a flywheel press. The straight strap is welded to the outer channel and then, after painting, is bolted to the straight strap. The tension springs 212 are made from stainless steel and are attached to allow the slotted arms 210 to rotate outward and then be pulled back so the guide straps rests against the tire tread. The 0.50" thick safety stops are welded on the wheel base plate to prevent the arms from falling down to the floor if a tension spring 212 inadvertently breaks.

In a different embodiment, a method of using the tire lifting assembly 200 to remove and replace a wheel 204 and a tire 202 on a vehicle 106 is disclosed. The method comprises, moving the assembly 200 towards the vehicle 106 to set the wheel/tire (204, 202) on the roller platform 208 and adjusting the optimum height using a scissor jack mechanism and held in a vertical position with the help of the adjustable tire brackets 206. Rotating the rollers to align the hub in such a way that the studs line up with the wheel openings and whole support is pushed toward the vehicle to allow effortless installation of the wheel lug nuts. Once the installation is done, the assembly 200 is retracted from the wheel 204 and the tire 202 and moved to pick up the next one.

The preferred embodiments of the present invention disclose the tire lifting assembly 200 to allow the user to position and install a heavy wheel 204 and tire 202 on a vehicle effortlessly. The steel slotted arms 210 hold the wheel/tire (204, 202) vertically so the user can focus on installation rather than the lifting. The assembly 200 is manufactured using steel and other durable components so it has a very long product life, whether used in a home or a service location. The assembly 200 eliminates the manual lifting of tires 202 and wheels 204 to mount or remove them. The assembly 200 is configured to take the weight of a wheel 204 and tire 202 when the technician is removing or replacing them and therefore, there is no chance for the service technician to get physical injured or strained. The wheels 204 are just rotated on the roller platform 208 for easy access and adjustable to meet any tire size. The assembly 200 is height adjustable using the scissor jack mechanism to lift the wheel 204 and the tire 202 and takes their entire weight. This saves lot of down time for vehicles and enhances the quality of the maintenance.

Although a single embodiment of the invention has been illustrated in the accompanying drawings and described in the above detailed description, it will be understood that the invention is not limited to the embodiment developed herein, but is capable of numerous rearrangements, modifications, substitutions of parts and elements without departing from the spirit and scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A tire lifting device comprising:
   a frame mounted on a plurality of wheels;
   a height-adjustable stand positioned on said frame, height-adjustable stand having at least two opposing spaced rollers for supporting and engaging a lower circumference of a tire while allowing said tire to rotate;
   a pair of length-adjustable support tubes disposed at opposite sides of the frame;
   a tire guide at an upper end of each of said adjustable support tubes;
   a telescoping cylinder for moving the tire guide on each of said adjustable support tubes inwardly and outwardly within an arcuate path toward and away from a tire resting between said two spaced rollers, the telescoping cylinder having a lower end attached to said frame and an upper end attached to said tire guide whereby extension of said cylinder moves said tire guide toward said tire and retraction of said cylinder moves said tire guide away from said tire.

2. The tire lifting device according to claim 1 wherein said telescoping cylinder for moving the tire guide on each of said adjustable support tubes inwardly and outwardly within an arcuate path toward and away from a tire resting between said two spaced rollers further comprises a controller for automatically extending and retracting said cylinder.

3. The tire lifting device according to claim 1 wherein said support tubes are spring-biased inwardly toward said tire.

4. The tire lifting device according to claim 1 further comprising means for moving said spaced rollers inwardly and outwardly to accommodate varying sized tires.

5. The tire lifting device according to claim 4 wherein said means for moving said spaced rollers inwardly and outwardly to accommodate varying sized tires comprises:
   a motorized threaded drive shaft;
   a threaded nut attached to each of said rollers whereby rotation of said drive shaft moves each of said rollers inwardly or outwardly.

6. The tire lifting device according to claim 1 wherein said tire guide is configured to grip opposing sides of a tire.

* * * * *